Figure 1:
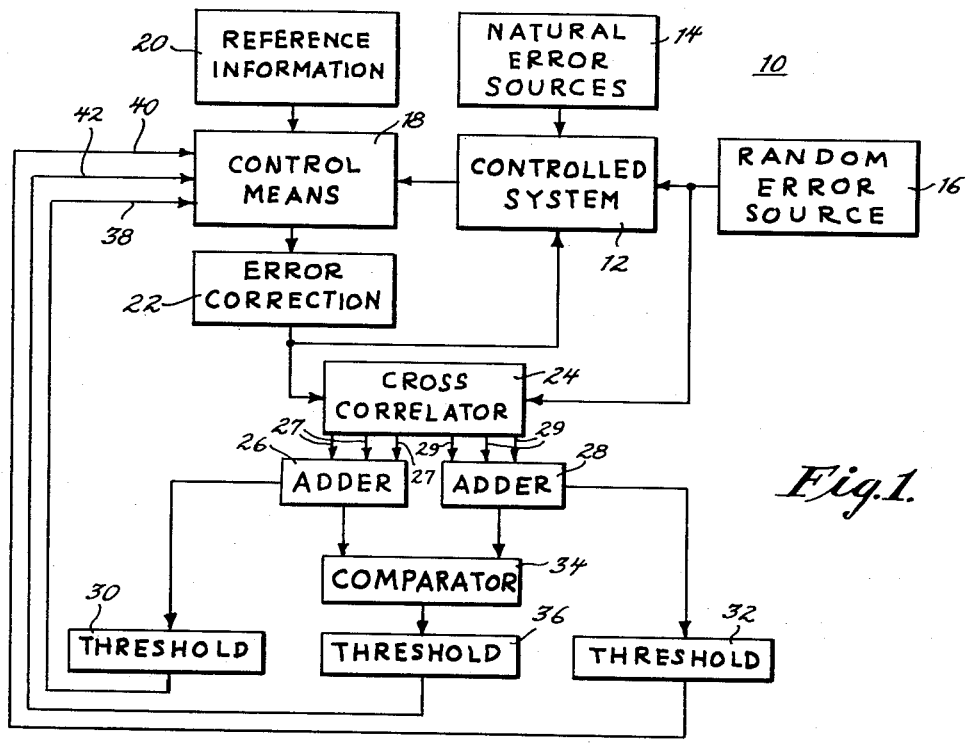

July 17, 1962 R. W. ROOP 3,045,221
MONITORING DEVICE
Filed Jan. 22, 1958 2 Sheets-Sheet 1

INVENTOR.
ROBERT W. ROOP
BY
Trachtman & Zoda
ATTORNEYS.

July 17, 1962  R. W. ROOP  3,045,221
MONITORING DEVICE

Filed Jan. 22, 1958  2 Sheets-Sheet 2

INVENTOR.
ROBERT W. ROOP
BY
Trachtman + Zoda
ATTORNEYS.

United States Patent Office 3,045,221
Patented July 17, 1962

3,045,221
MONITORING DEVICE
Robert W. Roop, Sewell, N.J., assignor to General Atronics Corporation, Bala-Cynwyd, Pa., a corporation of Pennsylvania
Filed Jan. 22, 1958, Ser. No. 710,427
8 Claims. (Cl. 340—213)

The invention relates to a monitoring device, more particularly to a monitoring device for a controlled system.

Heretofore monitoring devices have been provided which have monitored a particular characteristic inherent in a device or system for the purpose of determining the condition of the device or system and providing an alarm signal. However, a monitoring device has not been provided for monitoring the condition of a device or system which is not readily evident by its outwardly manifest characteristics. This is especially so, when the device or system is required to react differently to various combinations of conditions so that it is difficult to establish a manifest parameter by which to determine the required condition of the system which is to be monitored.

An example of a controlled system of this type which is to be monitored, may be an automobile which is driven along a roadway, so that its heading and inclination varies with the position of the automobile on the road. The characteristic to be monitored is the attentiveness of the operator of the automobile to the road conditions (although not the road conditions themselves) or the reaction of an automatic device which may be directing the vehicle along a roadway.

Such a system would also be that of a missile or aircraft under the control of a pilot or an automatic navigation device or autopilot. Similarly the monitoring device may be utilized in a chemical, mechanical and other systems.

It is therefore the principal object of the invention to provide a new and improved monitoring device for a controlled system.

Another object of the invention is to provide a new and improved monitoring device capable of monitoring an implicit characteristic of a system.

Another object of the invention is to provide a new and improved monitoring device for determining an implicit characteristic of a system not evident by its normally variable explicit characteristics.

Another object of the invention is to provide a new and improved monitoring device for monitoring the operative condition of a system having normal explicit characteristics which are not readily utilized.

Another object of the invention is to provide a new and improved monitoring device, for a system controlled by mechanical or human means, for monitoring the condition of said controlling means, said controlled system, or the combination of the controlled system and controlling means.

Another object of the invention is to provide a new and improved monitoring device for a system operating and reacting to various conditions and states which determine the reaction of the system to changes in its desired operating condition.

Another object of the invention is to provide a new and improved monitoring device and system for producing an alarm signal at the occurrence of predetermined conditions of operation, or acting upon the system to control it in accordance with the monitored information.

Another object of the invention is to provide a new and improved device and system having great utility for providing automatic control, safety control or alarm signals.

Another object of the invention is to provide a new and improved monitoring device and system for monitoring the condition of a system controlled by a human operator in which the human operator cannot counteract the monitoring action of the device to give an incorrect indication of the operating condition.

Another object of the invention is to provide a new and improved monitoring device and system which does not require or utilize the explicit conditions of the system for its monitoring action.

Another object of the invention is to provide a new and improved monitoring device and system which is highly accurate and reliable in operation, is efficient in operation, and may be readily modified to provide great utility in various applications.

The above objects are achieved by providing a monitoring device for a system utilizing feedback stimuli to maintain a predetermined condition comprising first means providing stimuli for randomly affecting the condition of the system, and second means for correlating the stimuli of the first means and the feedback stimuli of the system. The device may also include third means responsive to the second means for affecting the system, recording the correlation information of the second means, and/or providing an alarm signal upon the occurrence of predetermined conditions of correlation.

Figure 5:
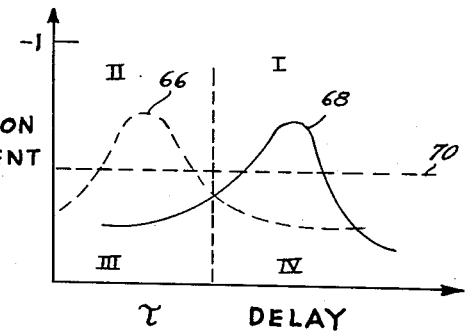
Figure 6:
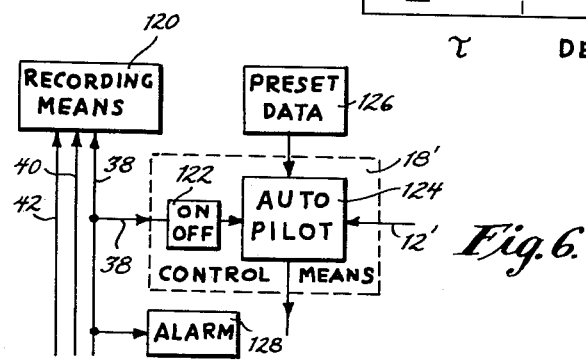
Figure 2:
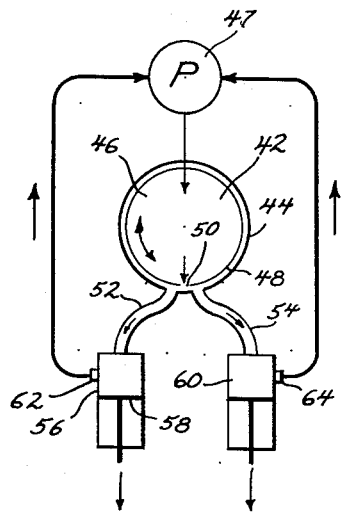
Figure 3:
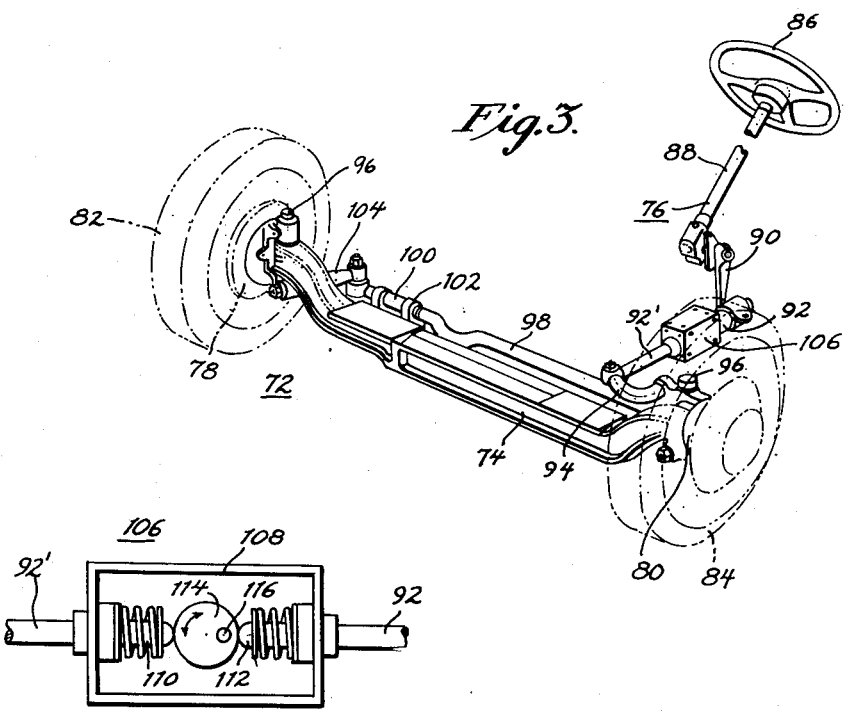
Figure 4:
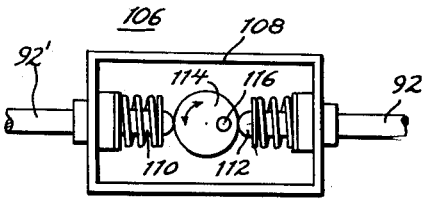

The foregoing and other objects of the invention will become more apparent as the following detailed description of the invention is read in conjunction with the drawings, in which:

FIGURE 1 is a schematic drawing in block form illustrating a monitoring device embodying the invention, FIGURE 2 is a diagrammatic representation of a hydraulic actuating means for utilization in the monitoring device of FIGURE 1, FIGURE 3 illustrates the front axle and steering means for an automobile adapted for the monitoring device of FIGURE 1, FIGURE 4 is an enlarged detailed view of the signal input means shown in FIGURE 3, FIGURE 5 is a graphic representation of the correlation signal derived from the cross correlator of FIGURE 1, and FIGURE 6 schematically illustrates in block form a particular application to air or space craft of the monitoring device of FIGURE 1.

Like parts are designated by like reference numerals throughout the several views.

The FIGURE 1 is a schematic drawing in block form illustrating a monitoring device 10 embodying the invention.

The device 10 comprises a controlled system 12 which is affected by natural error sources 14 and a random error source 16. A control means 18 receives information from the controlled system 12 as to its condition, as well as other information from a reference information source 20. The control means 18 provides an error correction signal 22 which is delivered to the controlled system 12.

The error correction signal 22 is also delivered to a cross correlator 24 which simultaneously receives signals from the random error source 16. Information relating to low values of correlation delay time are delivered by the cross correlator 24 to a first adder 26 by lines 27, while output signals relating to a high value of correlation delay time are delivered by the cross correlator 22 to a second adder 28 by lines 29. The output signal from the adder 26 is delivered to an amplitude threshold device 30, while the output of adder 28 is delivered to an amplitude threshold device 32. The outputs from the adders 26 and 28 are both delivered to a comparator 34 which delivers its output to an amplitude threshold device 36. The outputs from the threshold devices 30, 32 and 36 are respectively delivered over lines 38, 40 and 42 to the control means 18.

In operation, the controlled system which is affected by the error sources 14 and 16 is maintained in a predetermined condition by the error correction signal 22 received from the control means 18 which continually senses the condition of the controlled system 12. This in effect is a signal feedback loop for maintaining the controlled system 12 within predetermined operating conditions.

The monitoring device 10 functions to determine whether the controlled system 12 is being maintained within the predetermined conditions of operation, by determining the operation of the control means in effectively providing feedback signals to the system. This determines the ability of the control means to maintain the controlled system 12 within the predetermined operating conditions.

To determine this ability, the cross correlator 24 receives input signals from the random error source 16 and the error correction signal 22. If the cross correlator 24 delivers output signals on the lines 27 indicating correlation of the input signals for a low value of correlation delay time, the control means 18 is reacting properly to provide an error correction signal 22 within a short time for maintaining the controlled system 12 within the required operating conditions. However, the delivery of output signals on the lines 29 indicates that the input signals to the correlator 22 have a long correlation delay time. This means that the error correction signal 22 from the control means 18 occurs after a delay time which is longer than desired and indicates a sluggish response to the varying condition of the controlled system 12.

As a practical example of the operation of the device 10, consider its utilization in a guided craft which may be an aircraft under human control or automatically guided. The controlled system would be embodied in the craft. The natural error sources would be due to shifting winds, changes in altitude, air pockets, the spin of the earth, variations of power output of the engines, and other such error sources which may be random or determinable.

If the control means 18 is a human pilot, the pilot observes his instruments to determine the condition of the aircraft or controlled system 12 as affected by the natural error sources 14. The pilot following his flight plan and other such reference information 20 maintains the aircraft within its desired operating conditions by applying error correction signals 22 which may be for controlling the position of the aircraft, its velocity, the operation of its engines or propelling means and other such controllable means. In this manner the controlled aircraft system 12 is maintained within the required operating conditions. If the pilot is performing his functions properly a minimum delay occurs between the change in the desired condition of the controlled system 12 and the error correctional signal 22 applied by the pilot to restore the controlled system 12 to its desired operating condition. If the pilot is incapacitated and unable to perform his duty, then the delay in production of the error correction signal 22 will increase, so that, when the pilot does not react at all to the condition of the controlled system 12 the delay in the error correction signal 22 will be infinite.

As a particular example, take the situation when the error correction signal 22 is used to correct the position of the aircraft by controlling the tail elevator surfaces. The correction signal is applied by the aircraft hydraulic system to the tail surfaces principally controlling the altitude of the craft. The control surfaces are periodically actuated to maintain the required operating conditions.

In order to monitor the condition of the controlled system 12, the random error source 16 delivers error signals to the controlled system 12. In this case, this may be achieved by introducing variations in the pressure and flow of fluid in the hydraulic system to control the position of the elevator surfaces. The FIGURE 2, discloses a hydraulic means 42 comprising an outer shell 44 having an internal chamber 46 containing hydraulic fluid under pressure from a pump 47. The shell 44 has a revolving inner cylinder 48 provided with an aperture 50. When in alignment, the aperture 50 of the revolving cylinder 48 respectively delivers fluid under pressure to tubes 52 and 54.

The fluid under pressure received by tube 52 is delivered to an up actuating cylinder 56 for positioning its piston 58 to control the elevator control surface. When the aperture 50 is aligned with the tube 54, fluid is received by a down actuating cylinder 60 for moving the control surface in the downward direction. Each of the cylinders 56 and 60 is provided with an orifice return opening 62, 64 for returning fluid to the pump 47 and controlling the rate of motion of the actuated surfaces.

The random error signal source 16 may be utilized for driving a motor which randomly positions and rotates the internal cylinder 48 thereby applying random actuating forces to the control surfaces of the aircraft, in addition to the regular hydraulic forces controlled by the pilot for positioning said control surfaces.

As previously noted, the action of the cylinder 48 may be produced by a motor receiving an electrical random error signal from source 16. The random error signal from source 16 may be derived from a noise source and is also delivered to the cross correlator 24. It is noted that the noise signal results in the production of corresponding random actuations of the control surfaces of the aircraft. The random nature of the error source 16 causes the aircraft to deviate from its desired operating condition in a random manner. In order to counteract the random action of the error source upon the controlled system 12 and maintain the controlled system within the desired operation conditions, the control means 18 must produce error correction signals 22 which may be characterized as negative or 180 degrees out of phase with the random error signals. Thus the action of the pilot or control means 18 in maintaining the controlled system 12 within its desired operating conditions must also include response to the action of the random error source 16 upon the controlled system 12. The error correction signal 22 of the control means 18 is delivered together with the random error signals from source 16 to the cross correlator 24.

The cross correlator 24 may be of the type described in detail in the article entitled "An Analog Electronic Correlator for Acoustic Measurements" by Kenneth W. Goff published in vol. 27, No. 2, pp. 223 to 236 of the Journal of the Acoustical Society of America, of March 1955.

Since the phase of the error correction signal responsive to the random error signal from source 16 is 180 degrees out of phase therewith, a negative correlation coefficient will be produced by the cross correlator 27 as graphically illustrated in FIGURE 5. It is noted that the amplitudes of the signals from the output leads 27 and 29 will vary to produce a peak indicating the delay time for negative correlation of the input signals. If the control means 18 reacts promptly with minimum delay, then the peak value of the correlation coefficient (see FIGURE 5) will occur in quadrant II as indicated by the dashed lines 66. If the delay is such as to indicate that correlation occurs after a prolonged period of delay, the peak will be found in quadrant I as shown by the curve 68. If there is no correlation of the input signals, then signals having an amplitude within the quadrants III and IV will be delivered by all of the output leads 27, 29 of the cross correlator 24. It is noted that the signals lying within the quadrants II and III are delivered by the output leads 27, while signals lying within the quadrants I and IV are provided by the output lines 29 of the cross correlator 24.

The sum of the signals delivered by the output leads 27 is delivered to a threshold device 30 which produces an output signal only if the input amplitude exceeds that indicated by the horizontal dashed line 70 of FIGURE 5. Similarly, the threshold device 32 delivers an output signal when the output signal of the adder 28 has an amplitude exceeding that indicated by the line 70 of FIGURE 5. The comparator 34 supplies information with regard to the relative values or the difference in the amplitudes of the signals delivered by the adders 26 and 28. Similarly, the threshold device 36 delivers an output signal when the comparator 34 provides a signal exceeding a predetermined amplitude value indicating a peak in curve 68 exceeding a minimum value.

Thus, information from the cross correlator 24 is delivered by the threshold devices, 30, 32, 36 respectively over lines 38, 40 and 42 to the control means 18. If the control means 18 is a human pilot, the occurrence of signals over lines 30, 32, 36 indicatng that the correlation coefficient has a delay exceeding the maximum value desired (that is, coming within quadrant I) may be utilized to warn the pilot of this condition. The alarm information delivered to the pilot may be either visual, auditory, or sensory as by applying electric shock signals to the pilot.

The information from the cross correlator 24 may also be utilized to apply certain stimuli or controls to the control system 12 upon the indication of an emergency situation as where the error correction signals have a lag greater than the maximum permissible value and therefore do not provide timely reactions to the conditions of the controlled system 12.

By this means the cross correlator 24 continually determines the reaction of the controlled system 12 to the random error signals from the source 16. If the correlation signal from the correlator 24 provides a peak within the quadrant II the system 12 is under proper control from the control means 18 and no corrective measures are indicated.

If a peak does not appear in either of the quadrants I and II, then the cross correlator 24 shows the lack of correlation, indicating that the controlled system 12 is not receiving error correction signals responsive to the signals from the random error source 16. This is an emergency situation and appropriate remedial action is indicated.

The occurrence of a signal on line 38 indicates that the peak of the correlation coefficient signal is in quadrant II and that the system is operating satisfactorily. The occurrence of an output signal on line 40 shows that the correlation peak is in quadrant I and that the response of the device 10 is delayed beyond the desired limit and requires remedial action. Similarly, the absence of signals on both lines 38 and 40 indicates a lack of correlation and the necessity for remedial action. The information delivered on line 42 may be utilized to indicate the degree of correlation as represented by the ratio of the amplitudes of the maximum and minimum values of the correlation curve 68.

Refer now to FIGURE 3 which discloses an embodiment 72 of an axle 74 and steering means 76 of an automobile adapted for the monitoring device 10 of FIGURE 1.

The axle 74 is pivotally joined at its ends by king pins 96 to the hubs 78 and 80 on which are mounted the wheels 82 and 84. The steering wheel 86 is connected with the steering shaft 88 which rotates to actuate a driving arm 90. The driving arm 90 imparts a linear movement to the actuation rod 92. The actuating rod 92 is connected with the link 94 which is joined with the hub 80 for pivoting the wheel 82 about its king pin 96.

The link 94 is also joined with the end of a tie rod 98 which at its other extremity 100 passes through a guide bracket 102 joined to the axle 74. The end 100 of the tie rod 98 is pivotally secured with an actuating arm 104 which is joined with the hub 78 for controlling the angular position of the wheel 82. Thus, upon the rotation of the steering wheel 86, the position of the wheel 84 is controlled and coordinaated with the position of wheel 82 by means of the tie rod 98.

In addition to the usual arrangement of the front axle 74 and steering means 76 of the automobile, the actuating rod 92 has a second part 92' separated by an intermediate signal input means 106. The signal input means 106 includes a case 108 (see FIGURE 4) within which are positioned a pair of spring loaded cam ends 110 and 112 which are respectively joined with the intermediate end portions of the actuating rod 92. A cam wheel 114 is positioned intermediate the cam ends 110 and 112 for rotation about an eccentric drive shaft 116. The drive shaft 116 is connected to a motor (not shown) which is driven by a random error signal from source 16. This random error signal may be derived from a noise source, such as from atmospheric conditions by utilizing an open input lead to a signal amplifier.

In view of FIGURE 1, the operator of the automobile maintains his vehicle (which corresponds to the controlled system 12) in its proper operating condition on the roadway. The operator responds to the turns and other conditions of the road to maintain the vehicle on its proper course. This is achieved by actuating the steering wheel 86, as well as the other controls of the automobile. As the vehicle is driven along the roadway, the error source which provides random signals, injects corresponding error deviations into the steering apparatus of the vehicle by means of the signal input means 106. As the cam 114 rotates in response to the error signals, which rotations may be at various speeds and in either direction, the ends 92 and 92' are caused to extend and contract, thereby transmitting the error signals through the steering mechanism to the wheels 80, 82. This signal is transmitted in addition to the regular steering action of the operator as will be evident from the illustrations of FIGURES 3 and 4. The diameter and eccentricity of the cam 114 controls the maximum error which may be inserted in the system. A signal filter may be imposed on the electrical noise signal to the drive motor, to limit the frequency range of noise signals thereby further controlling the character of the error signals inserted into the system. Thus, the error signal may be controlled so that over a short period of time, the errors introduced into the steering mechanism are cancelled or averaged out, so that the position of the vehicle on the average is not materially affected and is not caused to deviate appreciably from the correct heading. This will prevent the vehicle from being run off the road by a delayed reaction of the operator to the changing operating conditions introduced by the error signal.

The interstate turnpike systems provide many miles of roadway which are straight or have a constant curvature and require only very slight and infrequent adjustments in the position of the vehicle to maintain the proper course heading. Under such conditions, it is not unusual for an operator of a vehicle to become inactivated and road hypnotized due to the slight and unvarying activities required in directing the vehicle and the generated periodic noise rhythms. Thus, the monitoring device 10, in addition to detecting and correlating the reaction of the operator, acts to maintain the operator alert by requiring him to continually make corrections in the steering mechanism to maintain the desired course of the vehicle along the roadway.

Since the error signal introduced into the system is of a random nature, the operator does not learn a repeated correction pattern which he can anticipate and automatically execute. Thus, the operator is not in a position to automatically respond in a learned or habitual manner while in a hypnotized state.

If the operator responds in the required manner, the cross correlator 24 gives a satisfactory response showing that the delay reaction of the operator is normal and not excessive. When the response of the operator, however, due to his inattentiveness to road conditions is delayed beyond the maximum desired limit, the absence of a signal on the line 38 and its presence on line 40 may be utilized to provide the operator with a visual, audible or other sensory stimuli. The absence of signals on lines 38, 40 and 42 indicates that there is an absence of correlation or prolonged delay in response. This may be utilized to apply the brakes of the vehicle or take such other appropriate action to control the vehicle in addition to providing the usual alarm signal.

In the case of vehicles used for public transportation such as busses or guided vehicles such as trains (where the motive power of the engine is varied to determine the reaction of the control means 18 or operator), the alarm signals as well as the application of emergency measures will result in increased safety and a reduction in the number of deaths due to travel hazards.

Busses, trucks and other such vehicles utilizing the device 10 may be provided with recording means for making a record of the correlation coefficient indicated by the cross correlator 24. This will be explained in greater detail below in connection with the FIGURE 6.

The FIGURE 6 schematically illustrates in block form a further particular application of the monitoring device 10 of FIGURE 1. The lines 38, 40 and 42, respectively from the threshold devices 30, 32 and 36, are delivered to a recording means 120 which produces a record of the correlation coefficient during the operation of the vehicle.

The information on line 38 may also be delivered to the control means 18' which is particularly adapted for use in an air or space craft. The information on line 38 is received by an on-off control switch 122 of the control means 18'. The on-off switch 122 in the absence of a signal on the line 38 delivers an "on" signal to an autopilot 124 of the control means 18'. The autopilot 124, which may be of the conventional type, when turned on, controls the heading and other operating conditions of the aircraft. The autopilot may receive preset data 126 for determining the heading and other such operating conditions of the craft and receives information over line 12' from the controlled system 12 corresponding to the condition of the craft.

The line 38 may also be connected with an alarm means 128 so that an alarm signal is given in the absence of a signal on the line 38. It is noted that the absence of the signal on line 38 corresponds to a correlation coefficient of the cross correlator 24 which is delayed beyond the maximum permissible value indicating an emergency situation.

It will be noted that the modified monitoring means of FIGURE 6 is of particular utility when installed in a craft to undergo strenuous flight tests. The autopilot may be preset to a given altitude and heading. When the pilot places the craft in a test dive and fails to respond to the conditions of the system indicating that he has "blacked-out," the absence of the signal on the line 38 produces an alarm and turns "on" the autopilot 112. The autopilot 112 then takes over, pulls the craft out of its dive, increases its altitude to the preset value and adjusts the orientation of the craft in accordance with the preset data.

It is also noted that a craft which is normally controlled by an autopilot may also be under the control of the device 10 so that when the autopilot fails to properly react to the random error signals from the source 16 an alarm signal is generated alerting the human pilot.

In the absence of a human pilot, such as in the case of guided missiles, the monitoring device may be incorporated in the system and the conditions of the craft telemetered to the control or monitoring station thereby indicating whether the controlled system is responding properly to control information which is present in the system or is being transmitted thereto from a remote location.

The recording means 120 makes a continuous record of the operation and reaction of the system which may be studied at a future time. Such information may be utilized to determine the capabilities of the system as well as the efficiency of the control means 18 or human operator involved in the operation of the controlled system 12. By determining the actual ability and condition of the control means 18 or operator by means of the recordings made, action may be taken to anticipate and eliminate deficiencies which may be present.

As previously mentioned the device 10 may be applied to mechanical and other processes and may be utilized in automation devices to determine the response of instrumentalities to control stimuli. Other applications include the adjustment of operating conditions of the system responsive to the delay of the correlation coefficient from the cross correlator 24. Thus in a system in which the delay in the response to stimuli is controlled by the system the correlation signal may be utilized to provide a feedback signal to maintain the desired response time of the system.

While only a few representative embodiments of the invention are disclosed herein there will be obvious to those skilled in the art many modifications and variations accomplishing the foregoing objects and realizing many or all of the advantages, but yet which do not depart essentially from the spirit of the invention.

What is claimed is:

1. Apparatus for monitoring a servo whose normal operation is subject to fortuitous disturbances, said apparatus comprising: means coupled to said servo and substantially continuously injecting into said servo random disturbances unrelated to said fortuitous disturbances and having an average value of zero over a period which is long compared with the duration of any one of said random disturbances; means included in said servo and responsive to said disturbances to produce departures from said normal servo operation; means included in said servo and applying to said disturbance responsive means corrections opposing said departures; means coupled to said servo and extracting said corrections from said servo; and means coupled to both said injecting and extracting means and measuring the correlation between said injected disturbances and said extracted corrections.

2. The apparatus of claim 1 further characterized in that said injecting means comprises an electrical noise signal generator.

3. The apparatus of claim 2 further characterized in that said extracting means comprises means translating said corrections into corresponding electrical signals.

4. The apparatus of claim 3 further characterized in that said correlation measuring means comprises means determining the correlation between said electrical noise signal and said electrical signals corresponding to said corrections.

5. The apparatus of claim 4 further characterized in that said correlation determining means comprises means supplied with both said electrical signals and responsive thereto to produce two sets of electrical signals, the amplitudes of the different signals in one said set representing the relative degrees of correlation at different time delay values within a given range of said values and the amplitudes of the different signals in the other said set representing the relative degrees of correlation at different time delay values within a different range of said values.

6. The apparatus of claim 5 further comprising means responsive to said produced signals to produce a different indication when the maximum amplitude of the signals in said one set exceeds a given threshold value than when the maximum amplitude of the signals in said other set exceeds said threshold value.

7. The apparatus of claim 6 further comprising means for producing a different indication when the amplitudes of all of the signals in either of said sets are below said given threshold value than when the amplitudes of any of the signals in either of said sets exceeds said threshold value.

8. The apparatus of claim 1 further characterized in that said servo comprises an operator controlled vehicle and in that said departures consist of misalignments between the actual path of said vehicle and a desired path for said vehicle.

References Cited in the file of this patent

UNITED STATES PATENTS

| | | |
|---|---|---|
| 2,487,793 | Esval et al. | Nov. 15, 1949 |
| 2,773,252 | Noxon et al. | Dec. 4, 1956 |
| 2,801,351 | Calvert et al. | July 30, 1957 |
| 2,823,877 | Hess | Feb. 18, 1958 |
| 2,839,715 | Shaw | June 17, 1958 |
| 2,859,005 | Owen et al. | Nov. 4, 1958 |